(12) United States Patent
Pan et al.

(10) Patent No.: US 8,117,660 B2
(45) Date of Patent: Feb. 14, 2012

(54) SECURE CONTROL FLOWS BY MONITORING CONTROL TRANSFERS

(75) Inventors: Aimin Pan, Beijing (CN); Kaimin Zhang, Hefei (CN); Hai Long, Nanjing (CN); Bin Benjamin Zhu, Edina, MN (US)

(73) Assignee: Microsoft Corporation, Redmond, WA (US)

( * ) Notice: Subject to any disclaimer, the term of this patent is extended or adjusted under 35 U.S.C. 154(b) by 909 days.

(21) Appl. No.: 12/141,918

(22) Filed: Jun. 19, 2008

(65) Prior Publication Data

US 2009/0320129 A1    Dec. 24, 2009

(51) Int. Cl.
*G06F 11/00* (2006.01)

(52) U.S. Cl. ............... 726/25; 726/22; 717/131

(58) Field of Classification Search .......... 726/22, 726/25; 717/131
See application file for complete search history.

(56) References Cited

U.S. PATENT DOCUMENTS

| 6,154,877 | A  | * | 11/2000 | Ramkumar et al. ........... 717/114 |
| 6,301,699 | B1 | * | 10/2001 | Hollander et al. ............ 717/131 |
| 7,181,737 | B2 |   | 2/2007  | de Jong et al. |
| 7,207,065 | B2 |   | 4/2007  | Chess et al. |
| 7,603,715 | B2 | * | 10/2009 | Costa et al. ................. 726/25 |
| 2003/0066055 | A1 | * | 4/2003 | Spivey .......................... 717/131 |
| 2004/0133777 | A1 |   | 7/2004 | Kiriansky et al. |
| 2006/0021054 | A1 |   | 1/2006 | Costa et al. |
| 2006/0161978 | A1 |   | 7/2006 | Abadi et al. |
| 2006/0277539 | A1 |   | 12/2006 | Amarasinghe et al. |
| 2007/0180524 | A1 |   | 8/2007 | Choi et al. |
| 2007/0285271 | A1 |   | 12/2007 | Erlingsson et al. |
| 2009/0320129 | A1 | * | 12/2009 | Pan et al. ........................ 726/22 |

FOREIGN PATENT DOCUMENTS

| WO | 2006082380 A1 | 8/2006 |
| WO | 2008002350 A1 | 1/2008 |

OTHER PUBLICATIONS

"Calling Stacks in the Profiling API", printed Sep. 28, 2011, 1 page.*
Budiu, et al., "Architectural Support for Software-Based Protection", ASID'06 Oct. 21, 2006, 10 pages.
Abadi, et al., "A Theory of Secure Control Flow", Feb. 2005, 15 pages.
Shi, et al., "Architectural Support for Run-Time Validation of Control Flow Transfer", Oct. 2007, 8 pages.
Linn, et al., "Protecting Against Unexpected System Calls", 2005, 16 pages.

(Continued)

*Primary Examiner* — Ponnoreay Pich
(74) *Attorney, Agent, or Firm* — Lyon & Harr, L.L.P.; Craig S. Fischer

(57) ABSTRACT

A cross-module detection system and method for detecting and monitoring control flow transfers between software modules in a computer system. The system and method detect and monitor control flows entering and exiting the software modules. For a particular module, a checking model is extracted from the binary file of that module. In addition, a relaxed shadow stack is generated. If the module is an original module, meaning that the control flow originated from that module, then the checking model is used to check the validity of the control flow transfer. Otherwise, the relaxed shadow stack is used. An interception module is used to intercept and terminate invalid control flow transfers. If an invalid control flow transfer is detected, then the transfer is terminated. Otherwise, the control flow transfer is allowed to continue.

20 Claims, 8 Drawing Sheets

OTHER PUBLICATIONS

Wagner, et al., "Intrusion Detection via Static Analysis", 2001, 13 pages.
Abadi, et al., Control-Flow Integrity: Principles, Implementations, and Applications, CCS'05, Nov. 7-11, 2005, 14 pages.
Hofmeyr, et al., "Intrusion Detection using Sequences of System Calls", Aug. 18, 1998, 25 pages.
Sharif, et al., "Understanding Precision in Host Based Intrusion Detection", 2007, 21 pages.
"Component Object Model", Microsoft Corporation, 2007, 2 pages http://msdn2.microsoft.com/en-us/library/ms680573(VS.85).aspx.
"Intel 64 and IA-32 Architectures Software Developer's Manual: vol. 3: System Programming Guide", Nov. 2007, 646 pages.
Costa, et al., "Vigilante: End-to-End Containment of Internet Worms", SOSP'05, Oct. 23-26, 2005, 15 pages.
Newsome, et al., "Dynamic Taint Analysis for Automatic Detection, Analysis, and Signature Generation of Exploits on Commodity Software", 2005, 17 pages.
Chiueh, et al., "RAD: A Compile-Time Solution to Buffer Overflow Attacks", 2001, 20 pages.
Cowan, et al., "Buffer Overflows: Attacks and Defenses for the Vulnerability of the Decade", 2000, 11 pages.
Nanda, et al., "BIRD: Binary Interpretation using Runtime Disassembly", 2006, 12 pages.
Cowan, et al., "StackGuard: Automatic Adaptive Detection and Prevention of Buffer-Overflow Attacks", In the Proceedings of the 7th USENIX Security Symposium, Jan. 26-29, 1998, 16 pages.
"Stack Shield Technical Info File v0.7", Jan. 2000, 1 page, http://www.angelfire.com/sk/stackshield/.
"GCC extension for protecting applications from stack-smashing attacks", 2005, 2 pages, http://www.trl.ibm.com/projects/security/ssp.
Kiriansky, et al., "Secure Execution Via Program Shepherding", Aug. 2002, 16 pages.
Srivastava, et al., "Vulcan Binary transformation in a distributed environment", Apr. 20, 2001, 11 pages.
"Winamp bug leaves back door open", Published: Jan 13, 2000, 2 pages http://news.zdnet.co.uk/emergingtech/0,1000000183,2076304,00.htm.
"Microsoft Security Bulletin MS05-025, Cumulative Security Update for Internet Explorer", Published: Jun. 14, 2005, 4 pages, http://www.microsoft.com/technet/security/bulletin/MS05-025.mspx.
"Microsoft Security Bulletin MS06-014, Vulnerability in the Microsoft Data Access Components (MDAC) Function Could Allow Code Execution" Published: Apr. 11, 2006 http://www.microsoft.com/technet/security/bulletin/MS06-014.mspx.
"Microsoft Security Bulletin MS07-017, Vulnerabilities in GDI Could Allow Remote Code Execution", Published: Apr. 3, 2007, 3 pages, http://www.microsoft.com/technet/security/bulletin/MS07-017.mspx.
Linn, et al., "Obfuscation of Executable Code to Improve Resistance to Static Disassembly", 2003, 10 pages.

* cited by examiner

SECURE CONTROL FLOWS BY MONITORING CONTROL TRANSFERS

BACKGROUND

Software vulnerabilities are primary sources for many types of software attacks. The majority of software vulnerabilities result in the program execution deviating from the software developer's original intent. Currently, it is not possible to eliminate all bugs or design flaws using current software technologies. For software applications that accept external data, these bugs or flaws can be exploited to allow malicious users to gain access to sensitive data. These types of attacks are called control flow attacks. Common examples of control flows attacks are stack buffer overflow attacks, format string and injected code attacks.

Control flows are well studied to detect control-flow attacks. A typical approach is to use static analysis techniques to construct a control flow model for binary modules and then check the control flows against the model at run time. This approach is feasible for checking the control flows in a single module, but impractical for the programs with multiple modules, such those running on Microsoft® Windows.

Various possibilities have been researched to enforce keeping program execution consistent with the developer's intention. One such approach is to extract a model (such as system call sequences) from the source code and check the execution against the model. A fine-granularity model built upon the branches of program execution can also be extracted to act as a checking model. Another approach is to extract a model of system calls and then check the trace of system calls when the program is running. However, in real-world applications the source code or symbolic information is not always available. In this case, the model can be extracted statically from binary executables using disassembly technology. However, the challenge is to guarantee the accuracy of disassembly and to recover the application semantics (in order to lower false alarms). Because it is not always possible to determine the control transfer paths, especially due to indirect branch instructions, the model might be imprecise or the checking rules have to be loosened. Therefore, it is crucial to construct a model or a set of rules which can not only conform to all legitimate control transfers, but also identify possible attacks.

Modern software frequently consists of many modules generated by different software providers. Interface technology loosely connects these modules so that even new modules can be integrated into the existing software. As a result, many existing control flow enforcement approaches can not be applied to such software. Another obstacle is that commercial software or freeware often have their binaries obfuscated so that the checking model can not be accurately extracted with static analysis techniques. The large amount of false positives associated with these approaches makes them impractical.

There are many techniques that attempt to deal with buffer overflow attacks. Some of these techniques require the program to be recompiled or source-modified. At least one technique uses a shadow call stack to detect the case of stack smashing. For real-world applications, however, a strict shadow call stack is insufficient because the non-standard control transfers such longjmp and exception handling (and some obfuscated functions in commercial software) can break the call/return pairing and lead to false positives.

There are also many different approaches to monitor the control flows of a program. One approach uses a program's static control flow graph at the system-call level to implement a host-based intrusion detection system. Another approach uses an interpreter to dynamically load the binary code and check and execute the code. This approach ensures that the destination of a control transfer is to a basic block that is loaded from the disk and not modified. This approach can prevent code injection attacks, and also ensures that a control transfer to a library can only go to an exported entry point, and thus prevent some existing code attacks. Yet another approach proves that control-flow models are basically more precise than system-call sequence models for intrusion detection systems. This approach implements an external monitor with binary rewriting technique to check against a static control flow model.

Other approaches use a binary rewriting technique to monitor control flows. Binary rewriting is a complex technique that first disassembles the code and then modifies the branch instructions to redirect the control to the supplied functions. In addition to the binaries themselves, some approaches require additional symbolic information. However, this information is not always available for monitored programs. Another approach uses a combination of static and dynamic analysis to rewrite the branch instructions so that the checking logics can be enforced. Yet another approach employs a different approach to effectively detect the external data being executed. This approach keeps track of propagation of untrusted data so that if the data is used in dangerous ways (for example, if the data is executed as code), then the detector can stop it and raise an alert. The trace information can be further used to generate a certified signature. The advantage of this approach is that there are no false positives. One problem, however, with this approach is that it incurs a significant performance overhead because it requires keeping track of data propagation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the cross-module detection system and method detect and mitigate control flow attacks by detecting and monitoring control flow transfers between software modules in a computer system. The system and method focus on control flow transfers between modules. Once a control flow transfer is detected, the validity of the transfer is determined in a variety of ways. If an invalid control flow transfer is detected, then the transfer is terminated. Otherwise, the control flow transfer is allowed to continue.

Embodiments of the cross-module detection system and method examine the branch instructions between modules, and build a model for each module which contains all the possible function starting addresses that can be referred to externally. A possible destination of an inter-module transfer is extracted from the binaries directly, and the set of destination addresses is used as the checking models. The extraction process is fast, and can be done either statically or dynamically. At run-time, when an inter-module control transfer is intercepted, it is checked against the checking model to see whether it is a legitimate entrance of the destination module. If the checking is successful, then the transfer continues; otherwise, an alert is generated.

Embodiments of the system and method do not employ disassembly techniques to extract the control flow information because even the most advanced disassembly techniques cannot guarantee the accuracy of disassembly results. Instead, embodiments of the cross-module detection system and method directly scan a binary file or the references to the code areas of the module being examined and then eliminate the obvious incorrect ones. Each of the remaining references is checked with general compilation knowledge to decide whether it is a legitimate entrance from outside of the module so that the resulting reference set contains only the function starting addresses which can be called by other modules.

As a control flow traverses among the modules, embodiments of the cross-module detection system and method keep track of the control flow information with a relaxed shadow stack. A current stack pointer is used as an indication to check if the stack grows or shrinks. When an inter-module control flow transfer occurs, the branch instruction is intercepted and checked against the models and the shadow stack. If the current stack pointer indicates that the stack grows, then the destination of the branch instruction is checked against the model of the target module, as described above. Otherwise, the control flow goes back to a module recorded in the shadow stack, and the current stack pointer will be consistent with the previous execution in that module. The combination of a static model for each module and a dynamic shadow stack for each control flow can effectively enforce the program execution satisfying fundamental requirements for inter-module interactions.

When the stack grows and the control flow enters a module (typically via a call instruction), the destination address is expected to be the beginning of a function in the target module (either exported or not). Thus, it is required to occur in the checking model for that module. However, when the stack shrinks (typically via a return instruction), the checking engine uses the context information (or the current stack pointer) to check whether the module which contains the destination of the branch instruction exactly lies in the control flow. For the checking logics to be done, a relaxed shadow stack is defined and recorded for each thread (or control flow). Each of the entries in the relaxed shadow stack corresponds to a module in the control flow and contains the information for that module and the stack pointers when entering or leaving the module. Therefore, the relaxed shadow stack works when a control flow enters or leaves modules, instead of when entering or leaving functions, and thus is called a relaxed shadow stack.

Using the relaxed shadow stacks as checking mechanisms serves to lower false positives while retaining the ability to capture existing control-flow attacks. False positive is a major problem that prevents many existing solutions from being applied in real systems. Although false negatives are possible due to the relaxation, it is possible to reduce them by using available information on interface semantics between modules. The relaxed shadow stack can work on a coarse-granularity of branch instructions because only the inter-module branch instructions are considered.

Embodiments of the cross-module detection system and method also include an interception module that intercepts and terminates invalid control flow transfers. The interception module makes use of the NO-EXECUTE flag hardware feature provided by modern processors to intercept the inter-module branch instructions. When a control flow transfer is detected, the NO-EXECUTE flag is turned on for the pages of all modules except the current module. Execution of a first instruction in the destination module will trigger an exception of access violation. The control flow transfer then is checked using the various checking methods described above, and determination is made as to whether the transfer went through a legitimate entrance or is valid by the above-described relaxed shadow stack checking method. If valid, the control flow is allowed to continue. Otherwise, an anomaly is reported and the control flow is terminated.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of the cross-module detection system and method reference is made to the accompanying drawings, which form a part thereof, and in which is shown by way of illustration a specific example whereby embodiments of the cross-module detection system and method may be practiced. It is to be understood that other embodiments may be utilized and structural changes may be made without departing from the scope of the claimed subject matter.

I. System Overview

Figure 1:
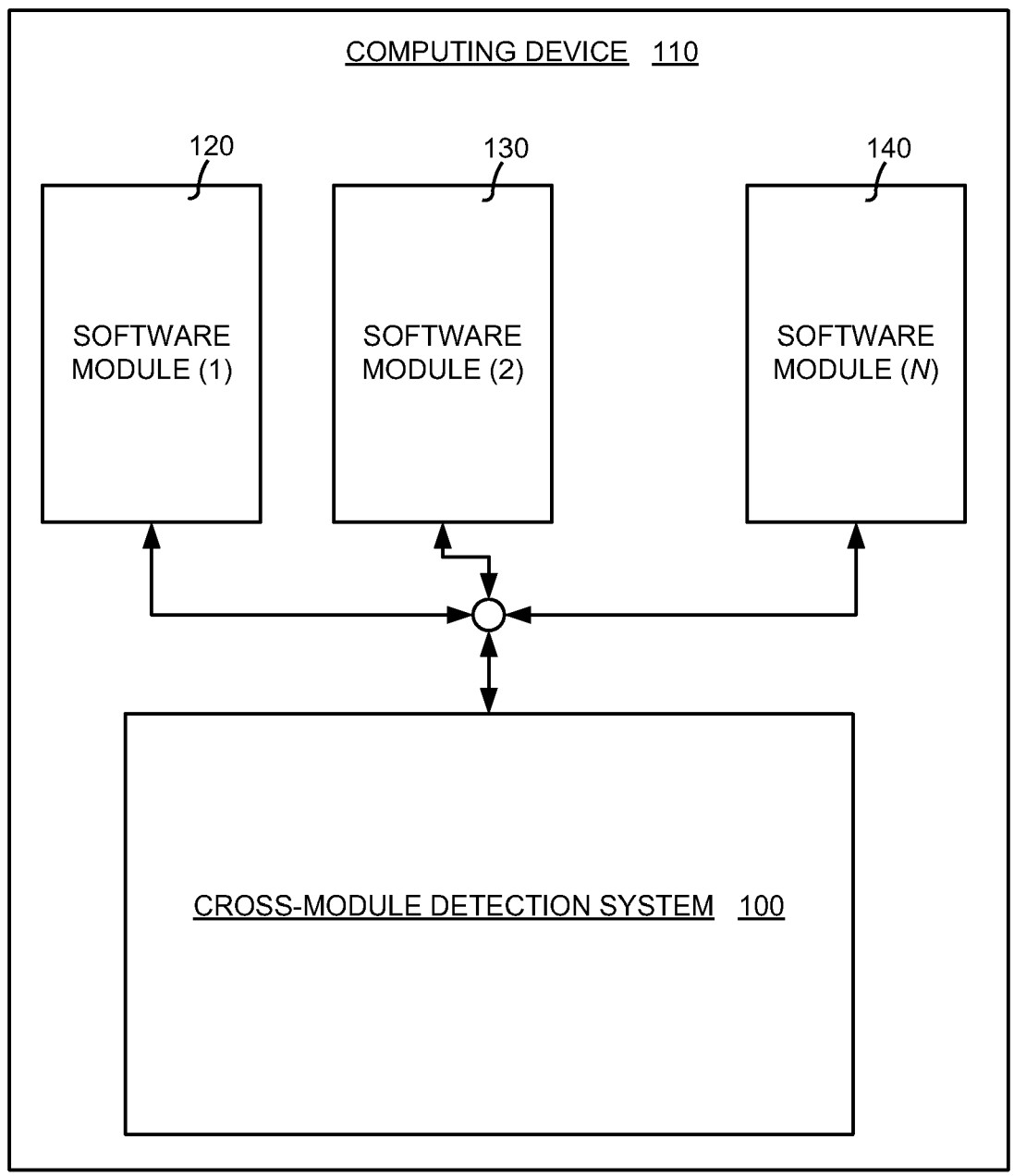
FIG. 1 is a block diagram illustrating a general overview of embodiments of the cross-module detection system and method disclosed herein.

FIG. 1 is a block diagram illustrating a general overview of embodiments of the cross-module detection system and method disclosed herein. It should be noted that the implementation shown in FIG. 1 is only one of many implementations that are possible. Referring to FIG. 1, a cross-module detection system 100 is shown implemented on a computing device 110. It should be noted that the computing device 110 may include a single processor (such as a desktop or laptop computer) or several processors and computers connected to each other.

Modern software is typically componentized, and the components are loosely coupled. A typical Microsoft® Windows software program, for example, consists of dozens of modules. These modules may come from various software vendors. The availability of additional information, such as source code, symbol information or type information, also varies. Moreover, interactions between modules do not follow the same standards. For example, traditional dynamic-link libraries are called via their exported tables, user interface (UI) components mainly use a messaging mechanism to interact with others, and COM modules use COM interfaces (virtual tables) to interact with each other.

This situation makes false some assumptions made by existing techniques, such that only exported functions can be called by other modules. Building a control-flow model for a module with source code or debugging information is not practical because for most modules, such information is not available. On the other hand, strict rules can cause lots of false positives when they are applied to the control flows of real executions. Even a reasonable rule that a return instruction would go back to the call site could be violated in normal control flows of many real applications. All these facts complicate the control flows of a program so that it is difficult to use a unified and precise model to regularize the control-flow checking.

Referring again to FIG. 1, software modules are shown on the computing device 110. In particular, software module (1) 120, software module (2) 130, all the way to software module (N) 140 are shown in communication with cross-module detection system 100. It should be noted that N may be any number of software modules. As explained in detail below, the cross-module detection system 100 detects when inter-module control flow transfers occur and validates that validity of those transfers.

Figure 2:
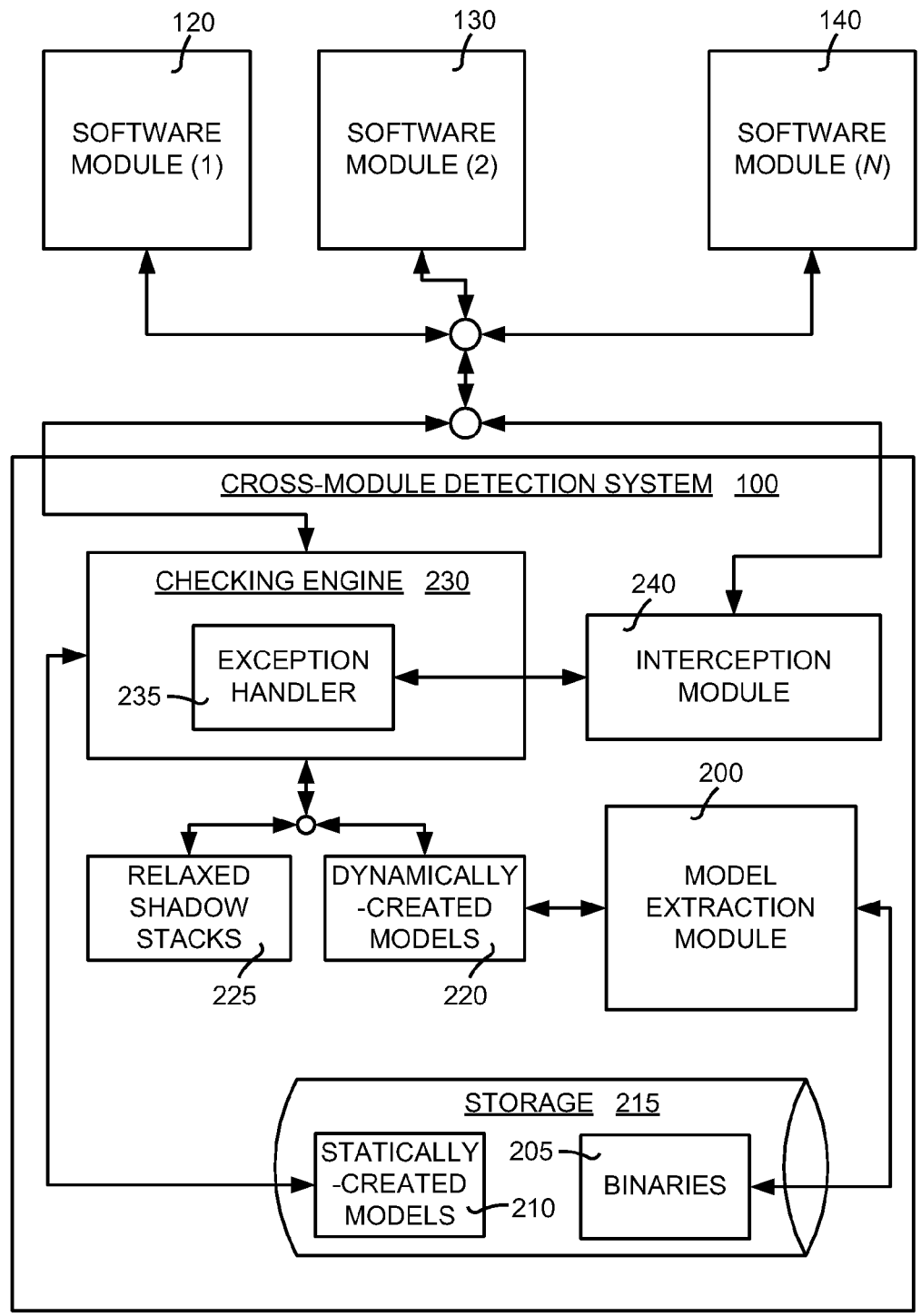
FIG. 2 is a block diagram illustrating details of embodiments of the cross-module detection system and method shown in FIG. 1.

Embodiments of the cross-module detection system 100 include a number of program modules. FIG. 2 is a block diagram illustrating details of embodiments of the cross-module detection system 100 and method shown in FIG. 1. A model extraction module 200 extracts models from binaries 205. These binaries 205 and statically-created models 210 are stored in memory storage 215. In addition to the statically-created models 210, the model extraction module 200 also generates dynamically-created models 220.

In addition, relaxed shadow stacks 225 are contained in the cross-module detection system 100. As explained below, a checking engine 230 uses the relaxed shadow stacks 225, the dynamically-created model 220, and the statically-created model 210 to check the validity of inter-module control flow. In other words, the control flow transfer between software module (1) 120, software module (2) 130, up to software module (N) 140, is verified by the checking engine 230.

The actual verification is performed by an exception handler 235 within the checking engine 230. The checking engine is in communication with an interception module 240. If there are any invalid control flow transfers between the software modules 120, 130, 140, then the interception module 240 will interrupt the control flow. The operation of each of these program modules is discussed in greater detail below.

II. Operational Overview

Control flows within a module are relatively easy to check. In contrast, the control transfers between modules are not easily modeled unless the involved modules are provided by the same software vender or their interactions are statically defined. In a modern software environment, the system or applications use various extension mechanisms through run-time binding, which makes inter-module interactions being determined at run-time.

In general, embodiments of the cross-module detection system and method focus on the control flow transfers between software modules. Embodiments of the cross-module detection system and method first extract a set of possible destination addresses of an inter-module transfer from binaries directly, and then use the set of destination addresses as the checking models. The extraction process is fast, and can be done either statically or dynamically. At run-time, when an inter-module control transfer is intercepted, it is checked against the model to see whether it is a legitimate entrance of the destination module. If the checking is successful, then the transfer continues. On the other hand, if the checking fails, then an alert is generated.

When the stack grows and a control flow enters a module (typically via a call instruction), the destination address is expected to be the beginning of a function in the target module (either exported or not). Thus, it is required to occur in our model for that module. However, when the stack shrinks (typically via a return instruction), a checking engine uses the context information (current stack pointer) to check whether the module which contains the destination of the branch instruction exactly lies in the control flow. For the checking logics to be performed, a shadow stack is recorded for each thread (a control flow), and each of its entries corresponds to a module in the control flow and contains the information for that module and the stack pointers when entering or leaving the module. Therefore, the shadow stack works on the granularity of modules instead of functions, thus is called a relaxed shadow stack.

Figure 3:
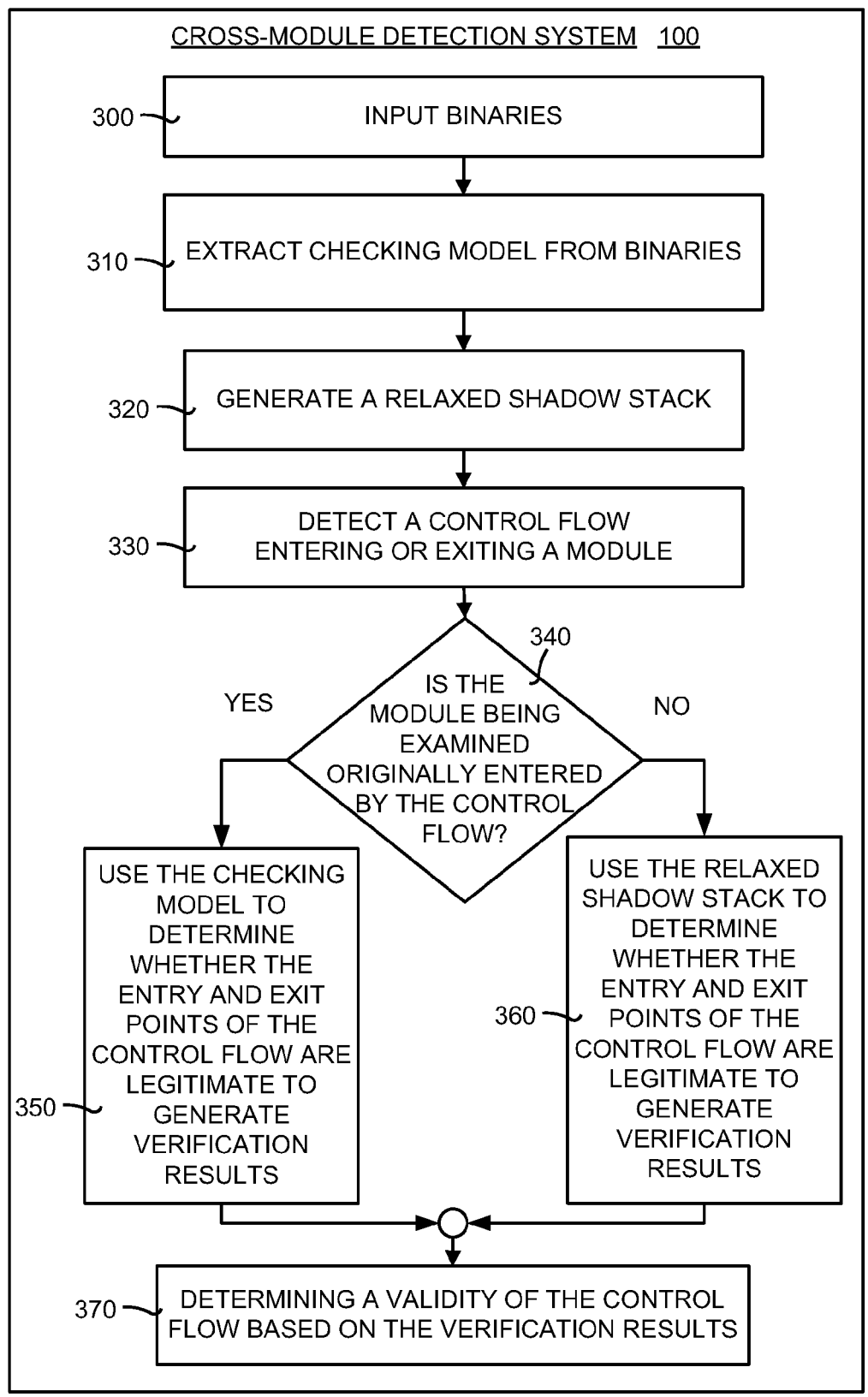
FIG. 3 is a flow diagram illustrating the operation of embodiments of the cross-module detection method shown in FIGS. 1 and 2.

FIG. 3 is a flow diagram illustrating the operation of embodiments of the cross-module detection method shown in FIGS. 1 and 2. The method begins by inputting binaries (box 300). From these binaries, a checking model is extracted to be used for checking validity of control flow transfers between modules (box 310). In addition, a relaxed shadow stack is generated (box 320) for a control flow. The relaxed shadow stack is described in further detail below.

The method then detects an inter-module control flow transfer by detecting whether the control flow is entering or exiting a module (box 330), according to the stack pointer and the relaxed shadow stack of the control flow. A determination then is made as to whether the module being examined is originally entered by this control flow (box 340). An entry to a module is said to be original by a control flow if the control flow is newly entering this module. In this case, the stack grows. If so, then the checking module is used to determine whether the entry point of the control flow is legitimate (box 350). Verification results are generated from this determination. If the module being examined is not originally entered, then the relaxed shadow stack is used to determine whether the entry and exit points of the control flow are legitimate (box 360). Once again, verification results are generated from this determination. Finally, the method determines the validity of the control flow based on the verification results (box 370).

III. Operational Details

The operational details of embodiments of the cross-module detection system 100 and method now will be discussed. These embodiments include embodiments of the program modules shown in FIG. 2. The operational details of each of these programs modules now will be discussed.

III.A. Model Extraction Module

The model extraction module 200 generates models that are used to check the legitimacy of an inter-module branch instruction when a control flow originally enters a module. The models are extracted directly from the binaries either before the program execution or at checking time.

III.A.1. Extracting Checking Model from Binaries

The purpose of building models for inter-module control transfers is two-fold. A first purpose is to first find all the possible entry points in code sections for each module. A second purpose is to then build the semantic relationship for these entries. The latter is an advanced requirement, which requires the knowledge of interface semantics between modules. The model extraction module 200 addresses the first purpose and categorize entry points of modules into different classes. This allows the checking engine 230 to accommodate various interfacing technologies in a simple way.

In order to be an entry point from other modules, an address in the code section of the module will be referenced in some way. This address can be found directly from the binary without need of disassembling the binary. The only exception to this is when the reference is intentionally hidden. Previous work in this area has shown that references found in this way can cover more than 98% of code areas in code sections for most of commercial or non-commercial software. This is assuming that the binaries are disassembled with recursive traversal starting from these references. The remaining part (<2%) of code sections may be embedded data, unreachable code, or some code for special purposes. This result indicates that the model extraction module 200 can find almost every one of the references to the function addresses, including the function references found directly from the binaries and those determined during disassembly. The references determined during disassembly do not need to be taken into account because they are referenced only when other functions in the same module are executed. In other words, they are not referenced outside of the current module.

Based on the principle that the reachable code regions are explicitly referenced with their leading addresses in the binary, it can be assumed that the model extraction module 200 can find legitimate entry points for each module directly from the binary. Furthermore, additional compilation information can be used to categorize the entry points so that the procedure of determining the legitimacy of an entrance is more precise. By way of example, the entries in jump tables are not permitted to be the destination of an inter-module transfer, but the entries in virtual tables are permitted. If an entry occurs in a push instruction, it is more likely passed as a function pointer argument (such as a callback procedure).

These categories used by the model extraction module 200 are listed in Table 1.

TABLE 1

| Entry points | Permitted to enter? | Entry points | Permitted to enter? |
|---|---|---|---|
| Entries in export table | YES | Entries in push instructions | YES |
| Entries in virtual tables | YES | Entries in SEH stack frames* | YES |
| Entries in jump tables | NO | Others | YES |

*SEH stands for Structured Exception Handling provided by Microsoft ® Windows.

The entry points that are obtained directly from binaries are a super set of actual permitted entries called from other modules. Embodiments of the cross-module detection system 100 and method use various hint information to eliminate the false entries so that the extracted models are as precise as possible.

Conventionally, the legitimate entrances into a module are the functions exported by the module. However, because multiple modules belonging to the same process share the same address space, any function in a module can be called directly by any other modules. This makes the legitimate entrances a superset of the exported functions. In fact, on a Microsoft® Windows, many inter-module interactions are performed using callback functions (also called function pointers) or COM interfaces, which are not exported at all. Embodiments of the model extraction module 200 statically extract the referenced functions directly from binaries without disassembling them.

Figure 4:
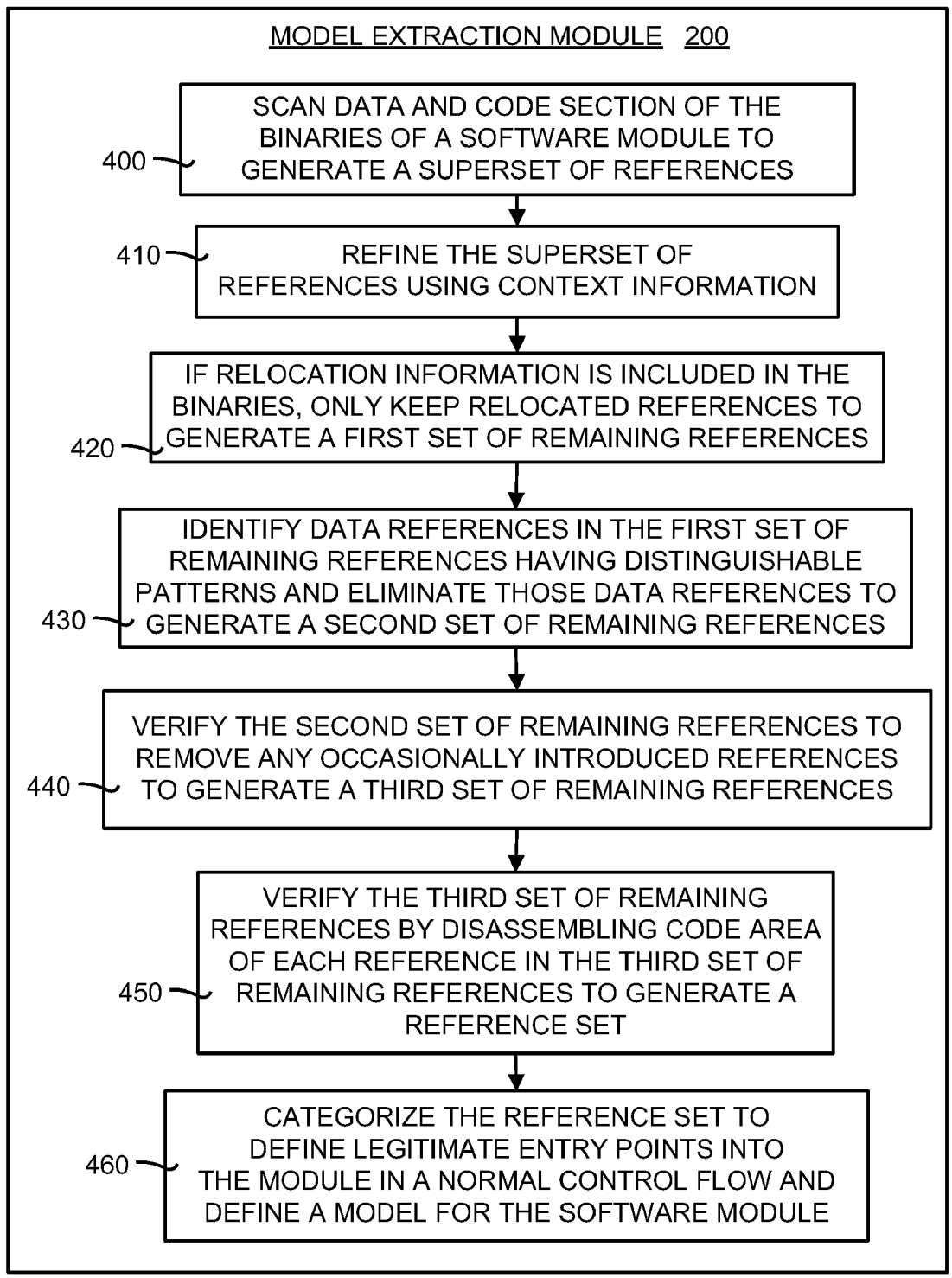
FIG. 4 is a flow diagram illustrating the operation of embodiments of the model extraction module shown in FIG. 2.

FIG. 4 is a flow diagram illustrating the operation of embodiments of the model extraction module 200 shown in FIG. 2. The method of the module 200 begins by scanning data and code section of the binaries 205 of a software module to generate a superset of references (box 400). This superset of references is refined using context information (box 410).

This context information can take many forms. If relocation information is included in the binaries 205, then the module 200 prunes the superset of references by keeping only relocated references in order to generate a first set of remaining references (box 420). The module 200 also indentifies data references in the first set of remaining references that have distinguishable patterns (box 430). Those data references having distinguishable patterns are eliminated to generate a second set of remaining references.

The second set of remaining references is verified to remove any occasionally introduced references (box 440). This process generates a third set of remaining references. The third set of remaining references is verified by disassembling a code area of each reference in the third set of remaining references in order to generate a reference set (box 450). This reference set is categorized in order to define legitimate entry points into the module in a normal control flow and to define a checking model for a particular software module (box 460). In some embodiments of the model extraction module 200, the information in Table 1 is used to categorize the references in the reference set.

III.B. Relaxed Shadow Stacks

The checking models created by the model extraction module 200 can be used to verify the legitimacy of any branch instructions when the control flow enters a module originally. However, they cannot be used to verify the legitimacy of the branch instructions when the control flow goes back to the original module, which are typically return instructions. In the cases of return instructions, the return address in the call stack could be modified during the execution of a function intentionally (such as for obfuscation) or unintentionally (such as in the typical case of stack buffer overflow attacks).

One way to detect the attacks of modifying the return address in the stack is to record the return address when entering a function and compare it with the return address in the stack when leaving the function. If the recorded value matches the return address in the stack, then the return instruction is legitimate. Otherwise, the return instruction is modified during the execution of the function and an alert is raised. This is commonly called a shadow stack.

A strict shadow stack can guarantee that call instructions are paired with return instructions in a control flow. For embodiments of the cross-module detection system 100 and method, only the inter-module branch instructions are intercepted. On a Microsoft® Windows x86 platform, these inter-module branch instructions might be a call, a jump or return instructions. Therefore, embodiments of the cross-module detection system 100 and method relax the strict shadow stack, and consider two semantics. Namely, entering a module and leaving a module are the only two semantics considered. Embodiments of the cross-module detection system 100 and method include a relaxed shadow stack checking method that works by keeping track of the actual control flow when it enters or leaves modules, instead of when it enters or leaves functions.

Figure 5:
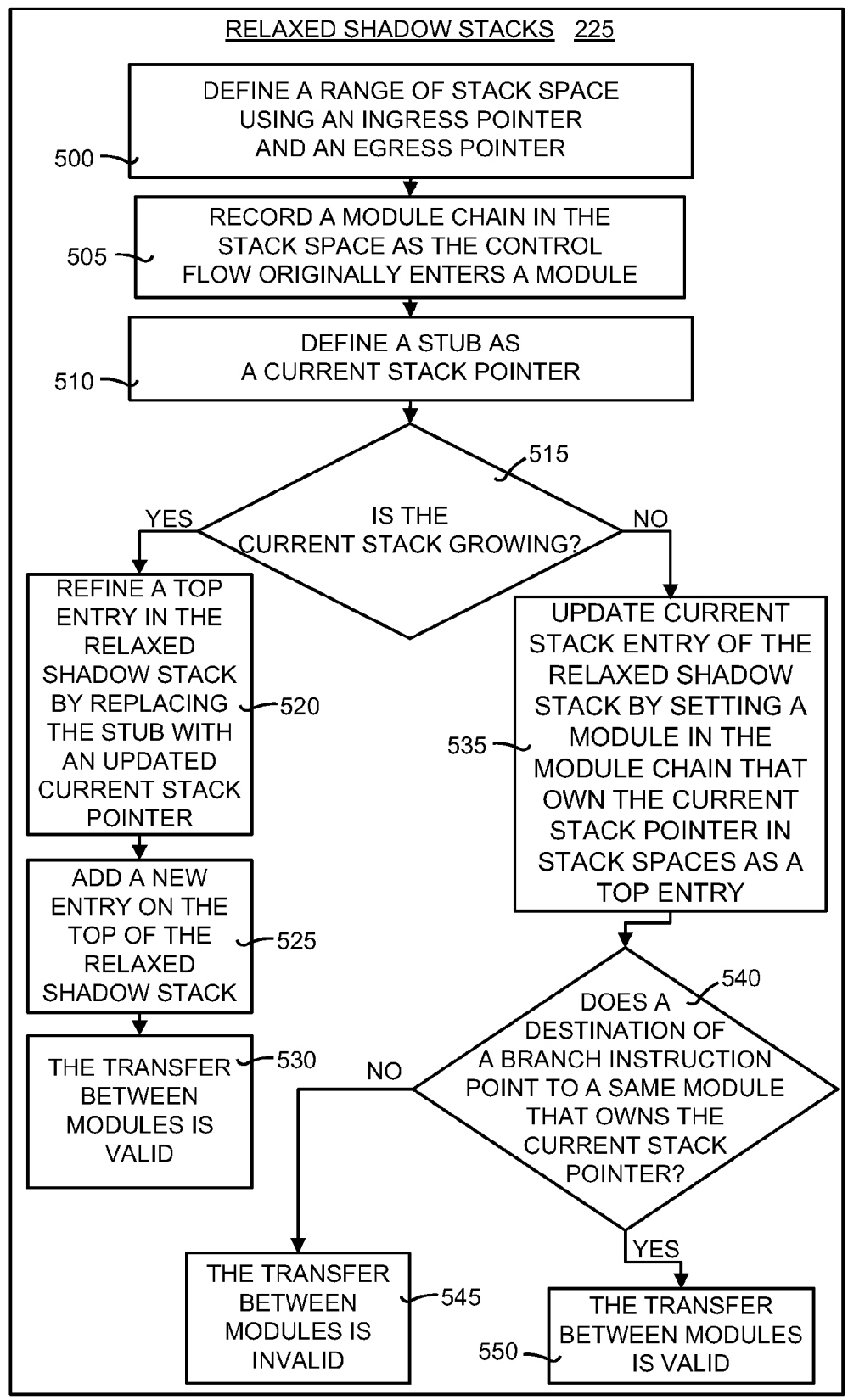
FIG. 5 is a flow diagram illustrating the operation of embodiments of the relaxed shadow stack shown in FIG. 2.

FIG. 5 is a flow diagram illustrating the operation of embodiments of the relaxed shadow stacks 225 shown in FIG. 2. When a control flow (or a thread on Microsoft® Windows) traverses among modules, embodiments of the cross-module detection system 100 and method dynamically construct a relaxed shadow stack. The method begins by defining a range of stack space using an ingress pointer and an egress pointer (box 500). In the module chain, each module owns a range of the stack space. This range of the stack space is defined by an ingress stack pointer and an egress stack pointer. In some embodiments the ingress stack pointer is _enter_stackpointer and the egress stack pointer is_goout_stackpointer. The _enter_stackpointer is the stack pointer when the control flow enters the module and the _goout_stackpointer is the stack pointer when the control flow goes out to the next module in the chain.

The relaxed shadow stack 225 records a module chain in the stack space as the control flow originally enters a module (box 505). In some embodiments the top entry in the relaxed shadow stack is defined as (0, _enter_stackpointer], where 0 is not an exact value of current stack pointer, but a placeholder representing the current stack pointer (<_enter_stackpointer).

A determination then is made as to whether the stack grows or shrinks by checking the value of the current stack pointer when a control flow enters a module (box 515). If the stack grows, then the top entry in the relaxed shadow stack 225 is refined with an updated current stack pointer (box 520). Then, a new entry is added on the top of the relaxed shadow stack (box 525). In some embodiments, this new entry is between 0 and <current stack pointer>. The control flow transfer then is declared valid (box 530).

Otherwise, if the stack does not grow, then the current stack entry of the relaxed shadow stack is updated by setting a module in the module chain that owns the current stack pointer in stack space as the top entry (box 535). This means the control flow is returning back to a previously-called module. A determination then is made as to whether a destination of a branch instruction points to the same module that owns the current stack pointer (box 540). If not, then the transfer between modules is invalid (box 545). Otherwise, the transfer between modules is valid (box 550).

The relaxed shadow stack 225 relaxes the branch instructions, including not only return instructions but also call or jump instructions. These call or jump instructions can go back to any location in any of previous modules in the module chain only if the stack pointer is owned by the same module. The relaxation makes embodiments of the cross-module detection system 100 and method treat some non-standard control transfers (such as longjmp, exception handling and signal mechanisms), as legitimate transfers. This serves to effectively reduce false positives.

In most cases, call instructions are used to enter a module, and return instructions to leave a module. However, in some cases jump instructions are also used to both enter and leave a module. The relaxed shadow stack unifies these branch instructions with the indication of the stack pointer. The risk of the relaxation is that the attackers have chances to evade the detection if they can control the stack pointer when the control deviates from the normal flows.

III.C. Interception Module

Modern processors provide several mechanisms to allow a system to interrupt the execution of a program. Typically, each instruction can be trapped if the single step switch is turned on when a program is debugged. In addition, Intel® x86 architecture also provides a single-step-on-branch feature, which allows monitoring all branch instructions. Embodiments of the cross-module detection system 100 and method can use either of these two mechanisms to intercept the inter-module control transfers because the intercepted instructions are a superset of inter-module branch instructions. However, excessive exceptions incur significant performance overhead because of at least two mode switches for each exception (from user mode to kernel mode, and back to user mode). One embodiment of the cross-module detection system 100 and method uses an x86 single-step-on-branch feature to intercept all branch instructions.

Figure 6:
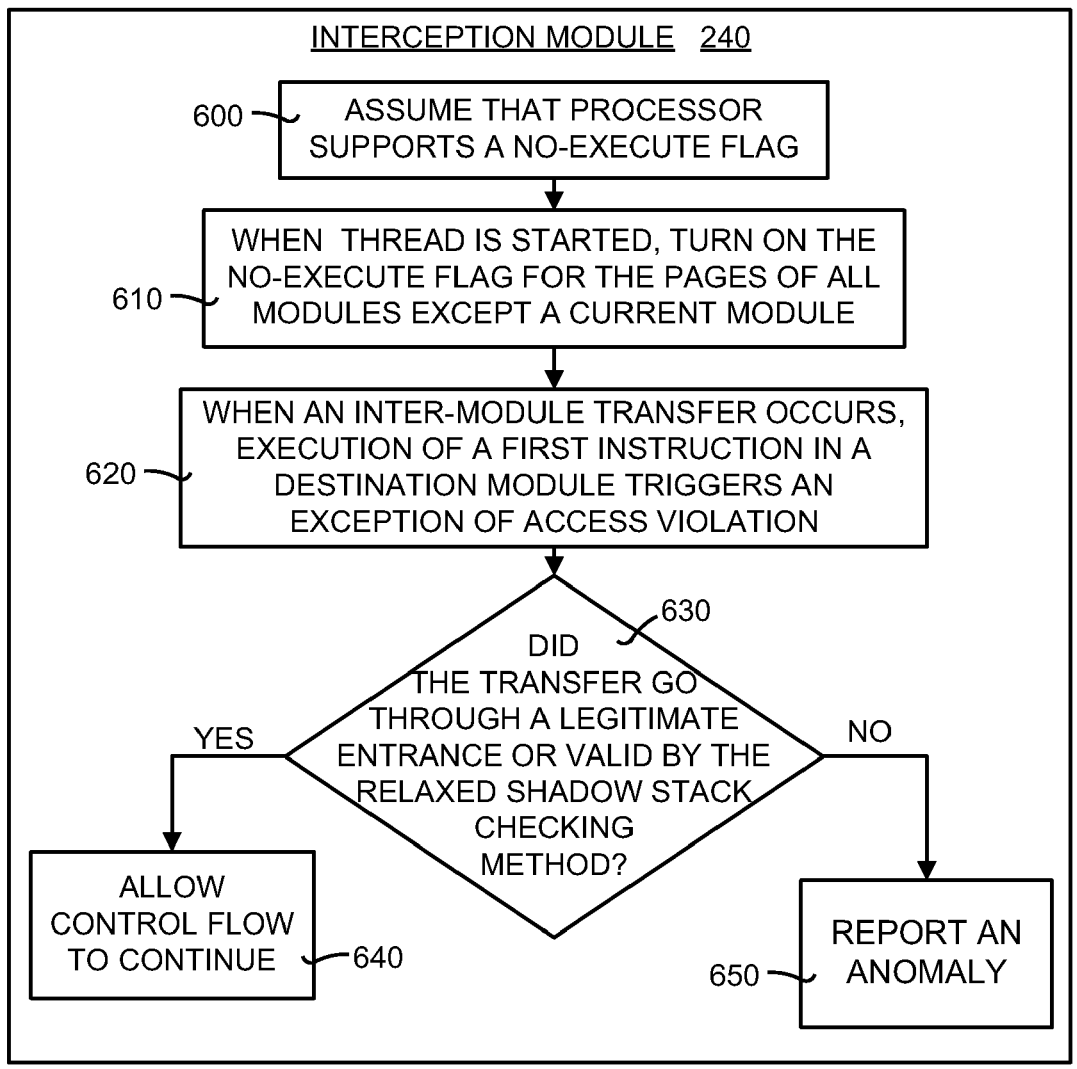
FIG. 6 is a flow diagram illustrating the operation of embodiments of the interception module shown in FIG. 2.

Another embodiment of the cross-module detection system 100 and method use an alternative way to intercept only the inter-module branch instructions. FIG. 6 is a flow diagram illustrating the operation of embodiments of the interception module 240 shown in FIG. 2. The method with the assumption that the processor supports a NO-EXECUTE flag (box 600). When a thread is started, the module 240 turns on the NO-EXECUTE flag for the pages of all modules except the current module (box 610). When an inter-module transfer occurs, execution of a first instruction in the destination module will trigger an exception of access violation (box 620).

Embodiments of the cross-module detection system 100 and method check the inter-module transfer using the checking engine 230, discussed below. Thus, the module 240 makes a determination as to whether the transfer went through a legitimate entrance or is valid by the above-described relaxed shadow stack checking method (box 630). If the transfer went through a legitimate entrance or was consistent with the relaxed shadow stack checking method, then the control flow is allowed to continue (box 640). Otherwise, the interception module 240 reports an anomaly (box 650). In order to trigger sequent inter-module control transfers, the exception handler 235 also turns on the NO-EXECUTE flag for the pages of the source module, and turns off the flag for the pages of the new module.

The NO-EXECUTE flag is specified for an individual page in the page table, and page tables are specific to a process. Therefore, for single-threaded programs, the above solution works well. Embodiments of the cross-module detection system 100 and method can track all the inter-module control transfers by turning on and off NO-EXECUTE flag for the pages. For multi-threaded programs, embodiments of the cross-module detection system 100 and method switch modules when context switches occur. In other words, embodiments of the cross-module detection system 100 and method turn on the NO-EXECUTE flag for the module where the old thread is running if the thread belongs to the target process, and turn off the flag for the module where the new thread is running if it belongs to the target process. It should be noted that this solution does not work on multi-core systems because there may be multiple threads in the process which are running in different cores and in different modules.

Although the number of exceptions is reduced to equal to the number of inter-module instructions, the performance overhead can be further reduced if embodiments of the cross-module detection system 100 and method manipulate the pages of modules in a finer granularity. By way of example, embodiments of the cross-module detection system 100 and method can just modify the attribute of one page when entering a module, and modify other pages' attribute on demand. The interception module 240 employs this optimization.

In some embodiments of the interception module 240, a system driver is used to hook the exception handler 235 and a context switch routine so that the control flows can be manipulated. The interception module 240 can also hook the kernel routine for creating a thread so that the interception module 240 can identify which threads are desired (in other words, which threads belong to the target process). The interception module 240 does not hook the kernel routine for loading a module. Instead a module list is maintained on demand. When an inter-module branch instruction is not targeted at any of existing modules, the module list is updated and the corresponding checking model is loaded or created on demand. In addition, some embodiments of the interception module 240 also include a watching program, which loads the driver and tells the driver which process is the target process. When a new module is loaded, the watching program is notified to build a checking model for the module if necessary and store the model in disk for future uses.

III.D. Checking Engine

Figure 7:
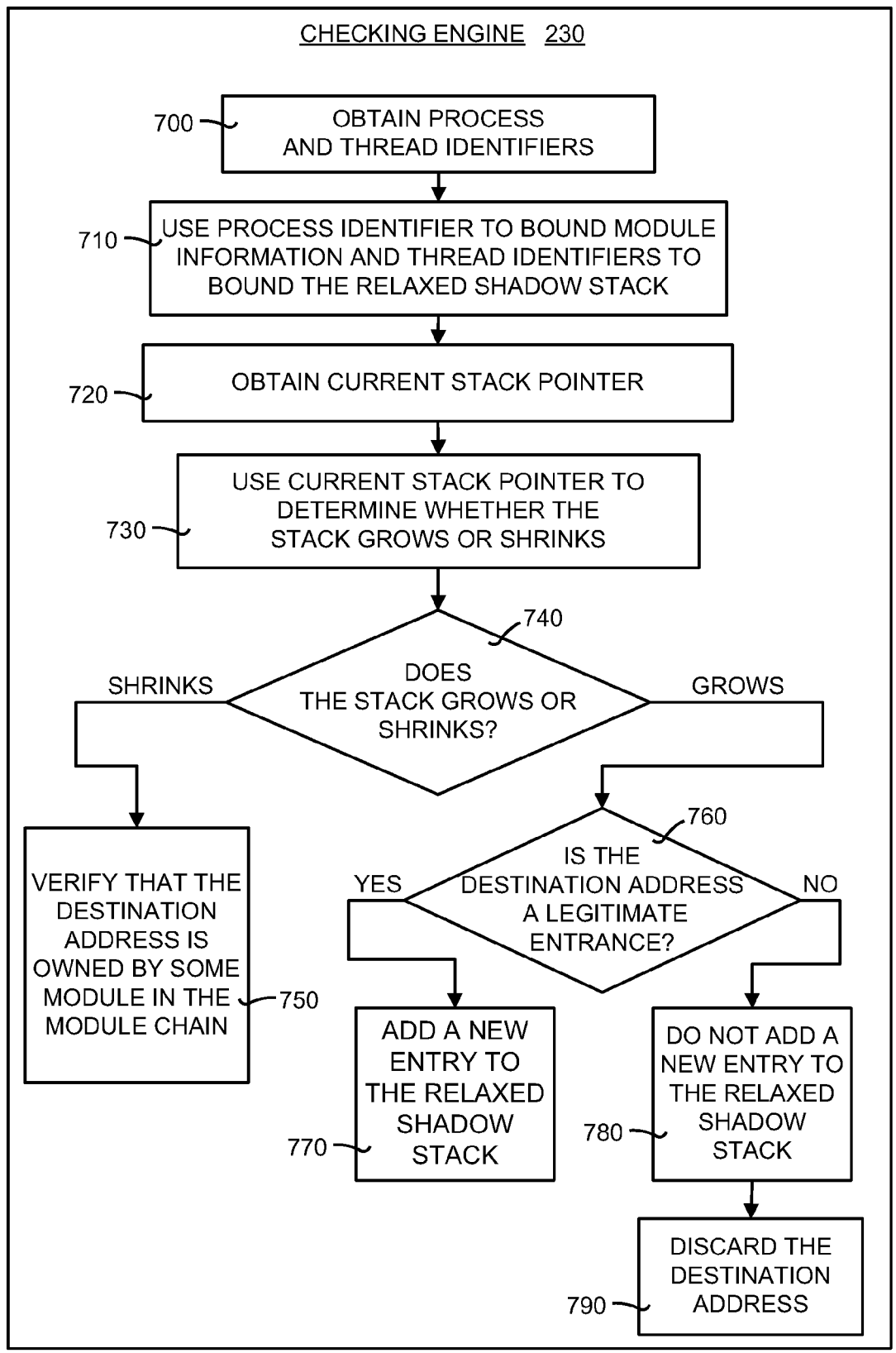
FIG. 7 is a flow diagram illustrating the operation of embodiments of the checking engine shown in FIG. 2.

The checking procedure is performed in the exception handler 235 of the checking engine 230 in kernel mode. FIG. 7 is a flow diagram illustrating the operation of embodiments of the checking engine 230 shown in FIG. 2. The checking procedure begins by obtaining the process and thread identifiers (box 700). This information obtained because the module information is bounded with a process and the relaxed shadow stack is bounded with a thread (box 710). Next, a current stack pointer is obtained (box 720). The current stack pointer is used to determine whether the stack grows or shrinks (box 730).

A determination is made as to whether the stack grows or shrinks (box 740). If the stack shrinks, the checking engine 230 verifies that the destination address is owned by some module in the module chain (box 750). In an Intel® x86 architecture, this is the esp register. On the other hand, if the stack grows, a determination is made by the checking engine 230 as to whether the destination address is a legitimate entrance of the destination module (box 760). If the destination is a legitimate entrance, then a new entry is added into the relaxed shadow stack (box 770). Otherwise, no entry is added to the relaxed shadow stack (box 780), and the destination address is discarded (box 790).

IV. Exemplary Operating Environment

Embodiments of the cross-module detection system 100 and method are designed to operate in a computing environment. The following discussion is intended to provide a brief, general description of a suitable computing environment in which embodiments of the cross-module detection system 100 and method may be implemented.

Figure 8:
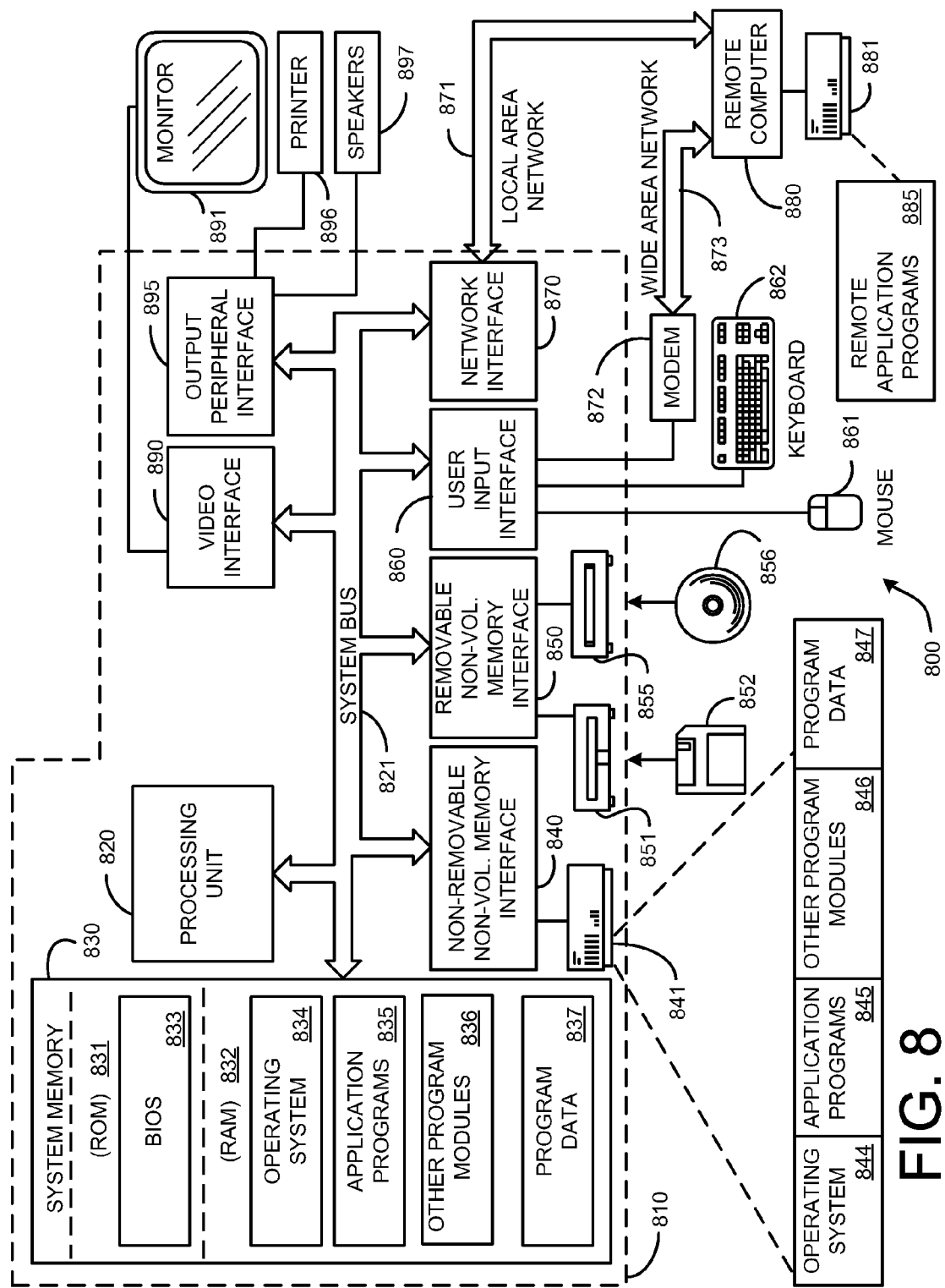
FIG. 8 illustrates an example of a suitable computing system environment in which embodiments of the cross-module detection system and method shown in FIGS. 1-7 may be implemented.

FIG. 8 illustrates an example of a suitable computing system environment in which embodiments of the cross-module detection system and method shown in FIGS. 1-7 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment.

Embodiments of the cross-module detection system 100 and method are operational with numerous other general purpose or special purpose computing system environments or configurations. Examples of well known computing systems, environments, and/or configurations that may be suitable for use with embodiments of the cross-module detection system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the cross-module detection system 100 and method may be described in the general context of computer-executable instructions, such as program modules, being executed by a computer. Generally, program modules include routines, programs, objects, components, data structures, etc., that perform particular tasks or implement particular abstract data types. Embodiments of the cross-module detection system 100 and method may also be practiced in distributed computing environments where tasks are performed by remote processing devices that are linked through a communications network. In a distributed computing environment, program modules may be located in both local and remote computer storage media including memory storage devices. With reference to FIG. 8, an exemplary system for embodiments of the cross-module detection system 100 and method includes a general-purpose computing device in the form of a computer 810.

Components of the computer 810 may include, but are not limited to, a processing unit 820 (such as a central processing unit, CPU), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer readable media. Computer readable media can be any available media that can be accessed by the computer 810 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 810. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 840 includes computer storage media in the form of volatile and/or nonvolatile memory such as read only memory (ROM) 831 and random access memory (RAM) 832. A basic input/output system 833 (BIOS), containing the basic routines that help to transfer information between elements within the computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information (or data) into the computer 810 through input devices such as a keyboard 862, pointing device 861, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 820 through a user input interface 860 that is coupled to the system bus 821, but may be connected by other interface and bus structures, such as, for example, a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A computer-implemented method in a computer system for verifying a validity of a control flow transfer to or from a software module, comprising:
   inputting a binary file of the software module;
   extracting a checking model from the binary file;
   generating a relaxed shadow stack for the control flow; and
   using one of the checking model or the relaxed shadow stack to determine the validity of the control flow transfer.

2. The computer-implemented method of claim 1, further comprising determining whether to use the checking model or the relaxed shadow stack to determine the validity of the control flow transfer.

3. The computer-implemented method of claim 2, further comprising determining whether the module being examined is originally entered by the control flow.

4. The computer-implemented method of claim 3, further comprising:
   determining that the software module is originally entered;
   using the checking model to determine whether an entry point of the control flow is legitimate to generate verification results; and
   determining the validity of the control flow transfer based on the verification results.

5. The computer-implemented method of claim 3, further comprising:
   determining that the software module is not originally entered;
   using the relaxed shadow stack to determine whether entry and exit points of the control flow are legitimate to generate verification results; and
   determining the validity of the control flow transfer based on the verification results.

6. The computer-implemented method of claim 2, further comprising:
   scanning data and code sections of the binary file to generate a superset of references;
   refining the superset of references using context information to obtain a reference set; and
   categorizing the reference set to define legitimate entry points into the software module and define the checking model.

7. The computer-implemented method of claim 6, wherein refining the superset of references further comprises:
   determining that relocation information is included in the binary file; and keeping only relocated references in the superset of references.

8. The computer-implemented method of claim 6, wherein refining the superset of references further comprises:
identifying data references in the superset of references that have distinguishable patterns; and
eliminating those data references have distinguishable patterns from the superset of references.

9. The computer-implemented method of claim 8, further comprising verifying the superset of references to remove any occasionally introduced references from the superset of references.

10. The computer-implemented method of claim 9, further comprising verifying the superset of references by disassembling code area of each reference in the superset of references to eliminate any references that lead to one or more invalid instructions.

11. The computer-implemented method of claim 1, further comprising:
assuming that a processor of the computer system supports a NO-EXECUTE flag; and
when the control flow is started, turning on the NO-EXECUTE flag for pages of all modules except a current software module.

12. The computer-implemented method of claim 11, further comprising:
triggering an exception of access violation when an execution of a first instruction in a destination module occurs during a transfer between the current software module and another module; and
determining whether the transfer went through a legitimate entrance or is valid based on the relaxed shadow stack.

13. The computer-implemented method of claim 12, further comprising:
allowing the control flow to continue if the transfer went through a legitimate entrance or is valid based on the relaxed shadow stack; and
reporting an anomaly if the transfer did not go through a legitimate entrance or is invalid based on the relaxed shadow stack.

14. A method for detecting invalid control flow between two software modules, comprising:
maintaining a relaxed shadow stack for a checked control flow;
obtaining a current stack pointer; and
detecting the invalid control flow using the relaxed shadow stack if the target software module is not originally entered.

15. The method of claim 14, further comprising:
defining a range of a stack space of the relaxed shadow stack using an ingress pointer and an egress pointer; and
recording a module chain with the stack space for each of the two software modules.

16. The method of claim 15, further comprising:
determining that the stack grows by checking a value of the current stack pointer;
refining a top entry in the relaxed shadow stack with the ingress and egress pointers for that module corresponding to the top entry;
adding a new entry on top of the relaxed shadow stack for a new entered module; and
determining that the control flow is valid using the checking model of the new entered module.

17. The method of claim 15, further comprising:
determining that the stack does not grow;
updating a current stack entry of the relaxed shadow stack by setting a module in the module chain that owns the current stack pointer in the stack space as the top entry; and
determining whether a destination of a branch instruction points to a same module that owns the current stack pointer.

18. The method of claim 17, further comprising:
declaring that the control flow is valid if the destination of the branch instruction points to the same module that owns the current stack pointer; and
declaring that the control flow is invalid if the destination of the branch instruction does not point to the same module that owns the current stack pointer.

19. A process for detecting and determining a validity of a control flow in or out of a software module in a module chain in a computer system, comprising:
inputting a binary file of the software module;
extracting a checking model from the binary file;
generating a relaxed shadow stack for the control flow;
detecting a control flow entering or exiting the software module;
determining whether the software module is originally entered by the control flow;
if the software module is originally entered by the control flow, then using the checking model to determine whether entry and exit points of the control flow are legitimate to generate verification results;
if the software module is not originally entered by the control flow, then using the relaxed shadow stack to determine whether entry and exit points of the control flow are legitimate to generate verification results; and
determining the validity of the control flow based on the verification results.

20. The process of claim 19, further comprising:
obtaining process and thread identifiers;
using the process identifiers to bound software module information and the thread identifiers to bound the relaxed shadow stack;
obtaining a current stack pointer;
using the current stack pointer to determine whether the stack grows or shrinks;
if the stack shrinks, then verifying that a destination address is owned by some module in the module chain;
if the stack grows, then determining whether the destination address is a legitimate address;
if the destination address is legitimate, then adding a new entry to the relaxed shadow stack; and
if the destination address is not legitimate, then discarding the destination address and not adding the new entry to the relaxed shadow stack.

* * * * *